Oct. 11, 1955
A. M. THOMSEN
2,720,515
METHOD OF REFINING TALL OIL
Filed March 19, 1954
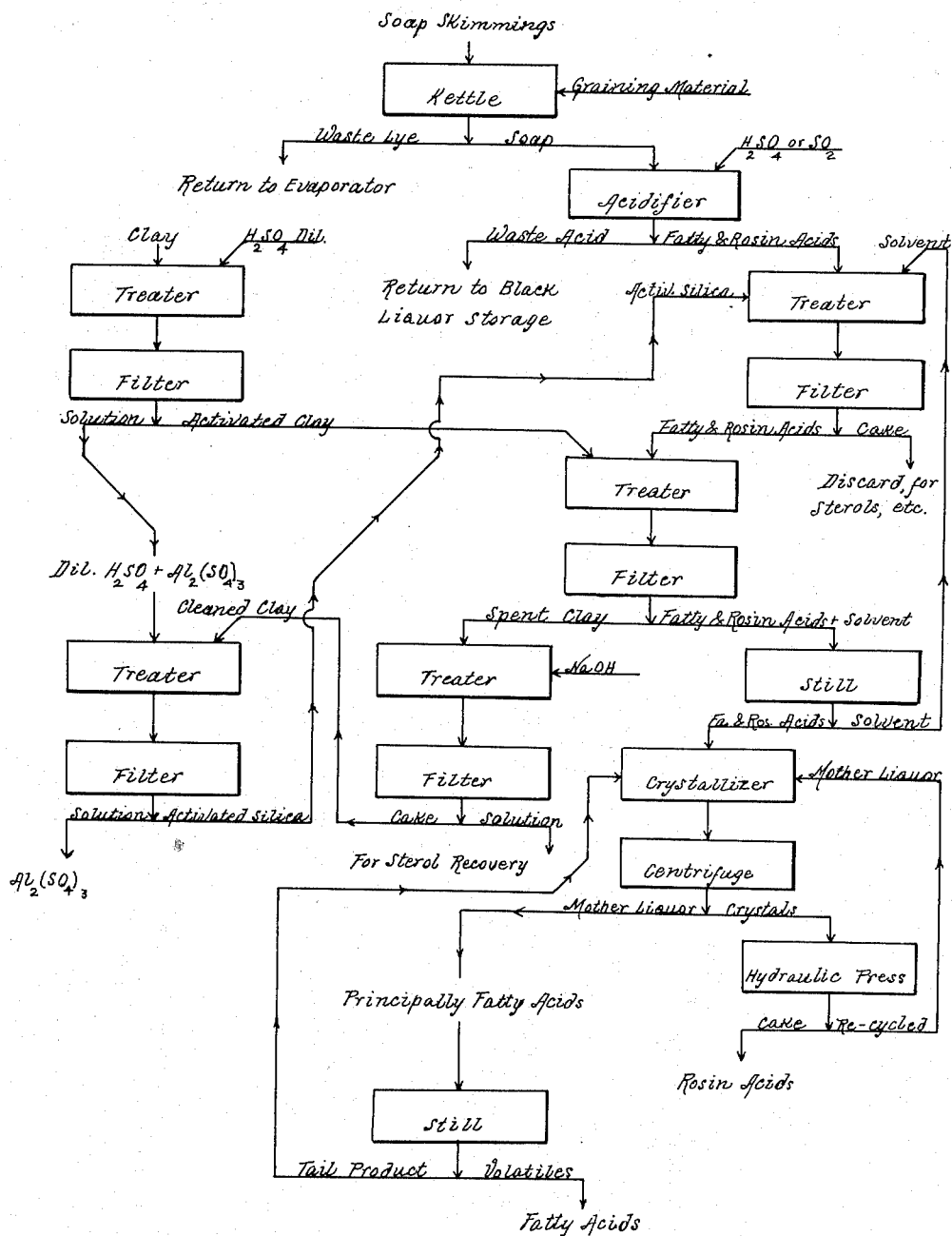
INVENTOR.
Alfred M. Thomsen 2,720,515

METHOD OF REFINING TALL OIL

Alfred M. Thomsen, San Francisco, Calif.

Application March 19, 1954, Serial No. 417,335

3 Claims. (Cl. 260—97.6)

Virtually the only method of refining tall oil today is by distillation. Said distillation is repeated and repeated until sundry fractions containing diverse ratios of rosin acids vs. fatty acids are obtained. In the main the impurities, including a high percentage of sterols, are concentrated in the tail product from the first distillation, the so-called tall oil pitch.

I attack this problem in an entirely different manner. I first introduce a standard soap making step, that of graining, in the primary recovery of the tall oil. Then I remove by adsorption most of the sterols and color bodies using for said purpose a specially prepared from of activated silica and acid-activated clay, both of which are prepared as a specific part of my process. Crystallization and centrifuging, or filtration, then removes a large part of the rosin fraction from the purified mixed acids and said separated crystal product is further treated in a hydraulic press until the remaining solid cake retains less than 1% of fatty acids. The liquid product obtained as the mother liquor from said crystallization may be sold as such or further refined as follows:

I subject this liquid fraction to a cautious and conventional high vacuum distillation but I accept only a small overhead portion leaving well over two-thirds as a tail product. By stopping short at this point I obtain as said overhead an almost pure product of fatty acids with very little rosin acids. The tail product is now recycled to the previously described crystallization step thus yielding a part of the contained rosin acids as a solid product and bringing the ratio of fatty acids to rosin acids back to the previous standard for the charging stock entering the still. To prevent undue accumulation of color bodies produced in the distillation I periodically return a portion of the tail product from the still to the adsorption step in place of directly to the crystallization step of the previously described treatments.

Three products are thus obtained from the tall oil, namely, fatty acids of a high degree of purity, rosin acids of even greater purity, and finally that adsorbed material retained upon the clap and silica in which nearly all the sterol fraction becomes concentrated. Inasmuch as said sterols are at least partially present as fatty acid esters of said sterols a further yield of fatty acids is obtained by the reworking of clay as herein indicated. The manufacture of the required adsorbents thus becomes a mandatory step in my process. Parenthetically, it may be mentioned that I am likewise able to obtain a far better product for adsorption than anything available on the market, by simply varying the time of treatment with acid to which the clay is being subjected in accordance with the actual results being obtained in the process. When I have more fully described my process by giving an illustration which represents a specific embodiment of said process as represented on the flow sheet, all steps and their mutual interdependence will become entirely clear.

It will become obvious to any one familiar with the refining of glyceridic oils that sundry low grade products produced in said refining can be advantageously converted into their constituent fatty acids by means of the steps recited herein. I refer to "foots" and still condensates from deodorizing, to clay used in the bleaching of said oils and to chars. All such will have their uses as raw material for my process.

The flow sheet will now be fully described, I commence with the soap skimmings from the conventional kraft or sulphate cook on coniferous woods. These are collected in a "kettle," of standard soap design, and the skimmings melted. Graining material, in this case sodium sulphate, is added and the kettle allowed to settle. A very dark colored lye separates which will be substantially saturated with the graining agent. Considerable soap remains in said lye but as I have shown it returned to the evaporator of the recovery system no loss of either soap or graining agent is incurred, hence no further instructions need be given. The main item in making any adjustments is to get as light colored a soap as possible.

Said soap is now shown as passed on into the "acidifier" which is merely a tank with an agitator where acid can be added to decompose the soap previously grained. I have shown the dark colored water resulting from said acidification as returned to the "black liquor storage" where the acid employed, be it sulphuric acid or sulphur dioxide, again is utilized. Such being the case for both the graining step and the acidification step it follows that no nicety is required, all losses being re-cycled into the process and all soda salts and sulphur salvaged. Both operations can, therefore, be conducted with an excess over actual requirements with consequent benefit to both.

The relative proportion of fatty acids and rosin acids in the raw material depend in the first instance upon the wood species employed in pulping and to some extent upon soil and climate. From our viewpoint it makes no difference what the actual ratio happens to be as the object of the process is to separate said constituents from one another. For the purpose of following the raw material through the various steps of the process I assume that the composition of the acidified product will be about 40% each of fatty acids and rosin with the remaining 20% made up of 12% sterols and 8% other impurities.

Wherever the word "treater" is used in said flow sheet it designates merely an agitated tank; filter and centrifuge are self-explanatory. The word "still" designates any device wherein the mixed fatty acids travel counter-current to the actuating steam flow, whether a high vacuum be employed or not. The "hydraulic press" is conventional.

The mixed acids entering the treater are seen as commingled with a diluting volatile solvent and with an activated silica coming from another step in my process. Heat is advantageous at this stage and may be as high as the boiling point of the solvent, or even higher, if a closed tank be used. That is at the discretion of the operator as is the type of solvent used. Because of fire risk I prefer a chlorinated solvent, such as tri-chlor-ethylene, but that is optional. Benzene or hexane are entirely permissible and impede adsorption less than do the chlorinated solvents. Assuming an operation on a batch basis, it is considered complete when two samples are taken at five minute intervals and show no change in color of the filtrate. The quantity of solvent must be such as to render filtration rapid and to permit of a good wash of the resultant cake.

When treatment is deemed complete the mixture is run to a filter where separation is made between the silica, loaded with impurities and virtually black in color, and a solution which may vary from deep yellow to a light brown. The cake is discarded so far as my process is concerned but it still serves as a starting point for sterol recovery. The filtrate is sent to the next treater in the series where it is commingled with an activated clay. The only variant in this case is the amount of such clay and this is strictly prescribed by the color of the resultant acid-solvent mixture, which in no case should be darker than a light straw color and may be made water white.

Here I will digress from the course of the fatty acid rosin acid flow to show the origin of the silica and activated clay employed. At the extreme left of the drawing I have indicated clay commingled with dilute sulphuric acid in a treater followed by a filtering step. A white china clay will serve very well if it be heated to approximately 500° C. prior to such commingling. The clay is finished when about one-third of the resident alumina has been removed but a better "yardstick" is the actual performance of said clay when used as a decolorizer for the fatty and rosin acids involved. Such empirical findings may seem poor technique but, in fact, do govern many of our largest industries rather than laboratory determinations.

After filtration and washing only drying is needed to fit the clay for the role it is to play in purification. The filtrate thus obtained is a mixture of water, sulphuric acid, and aluminum sulphate. It is reserved for future use as will be described at a later stage in the description.

When thoroughly saturated with color and sterols said clay is designated upon the drawing as "spent clay." It is shown as commingled in a treater with a solution of caustic soda and boiled. In half-an-hour or so the clay becomes entirely white once more and the very black solution in which it is suspended is then removed by another filtration, the filtrate serving as the starting point for the manufacture of sterols.

The resultant filter cake is seen as commingled with the acid solution derived from the previous treatment of clay and said treatment is continued with the application of heat until substantially all the resident alumina has been removed as a solution of aluminum sulphate. Separation is made by filtration as before and the residual silica, highly activated, is used as the medium for adsorption in the primary adsorption step as previously described. The use of the aluminum sulphate solution, from an economic standpoint, is outside of the scope of this disclosure but its importance is obvious.

Returning now to the de-colorized fatty and rosin acids after all the purification possible with adsorbents has been effected. The mixed acids and solvent are next seen as entering a still in which the solvent is removed and re-cycled. Such removal may be only partial for the presence of but a small amount of such solvent has much influence on the splitting-off by crystallization of the constituents with the higher melting points. Such items are entirely under the control of the operator and must be determined at each specific point by "trial and error" to find just the critical point at which the presence of such solvent becomes a disadvantage. For the purpose of this description I am assuming that all solvent has been removed.

After solvent removal the mixed acids are subjected to crystallization which is merely cooling while kept in a very slow motion. The rosin acids that crystallize are very free from fatty acids. A temperature above the crystallizing point of oleic acid is to be preferred if the rosin product is to be obtained in a high state of purity. I have shown a centrifuge used as the means of separating the rosin crystals but obviously a filter press could be used as well. However, it should be noted that not much more than one-half of the total rosin acids can be obtained in this step due to the solubility of rosin acids in the fatty acids. A subsequent crystallization, at a lower temperature will remove a good deal more and the rosin product thus obtained can be re-cycled to fresh mixed acids without any further processing. This step is not shown on the drawing. Whether such a step be advisable or not depends upon economic reasons as another method will now be described.

The mother liquor from crystallization is now sent to another still where superheated steam and a high vacuum are combined to drive off a fraction of almost pure fatty acids. As long as not more than one-third of the fatty acids are thus distilled very little rosin comes over. Naturally, the abundant tail product becomes a good deal higher in rosin and is re-cycled to the crystallizing step, a more advantageous place for fractionation than repeated re-distillations.

By whatever means obtained, the crystallized rosin acids retain a good deal of adherent fatty acid upon the crystal faces. Actually, the crystals are very pure. A convenient method of removing such liquid material is simple pressing which I have shown as effected in a conventional hydraulic press. The liquid product thus obtained is higher in rosin than the product going to the still and should be re-cycled to the crystallizer instead.

I will now describe a modification not shown on the drawing. It might have been thought that the so-called "cleaned clay" would have become re-activated by the caustic treatment but such is not the case. It has no adsorbing power at all. When treated with acid it responds as does fresh clay and hence becomes reactivated. I have found that the caustic step may be omitted if it be required to simply reactivate the clay. If the spent clay be treated with the partially used acid and a further quantity of alumina be removed then up to 80% of reactivation is effected. Evidently, the same amount of clay used in this manner will enable more decolorizing effect to be produced.

In the event that this process be used upon the low grade products emanating from oil refineries it is obvious that rosin will be absent. Instead there will be present a notable amount of stearic and palmitic acids. My process can thus be used to purify such low grade products and also to effect a separation into the constituent fatty acids. In this case, the retained solvent prior to crystallization becomes most important. Certain observations are also pertinent.

It is obvious that as "foots" contain unsaponified oils a preliminary cook with caustic is mandatory before the graining step. Likewise, clay and char require a preliminary cook with caustic to saponify the resident oils and removal of the resultant soap in water solution from clay and char before such material is considered as fit to enter into the cycle of operations described herein. Parenthetically, it may be noted that the clay thus obtained is quite suitable for initiating the series of steps herein prescribed and thus obviates the need of purchasing fresh clay. In any event, my process has such applications and I consider such as being within the scope of this disclosure.

Having thus fully described my process, I claim:

1. The method of refining tall oil which comprises; remelting the soap skimmings obtained in black liquor recovery; adding a graining agent and settling out the waste lye; remelting the soap thus obtained and acidifying the same with a mineral acid selected from the group consisting of sulphuric and sulphurous acid; separating the dark colored aqueous product; diluting the mixed fatty and rosin acids thus obtained with a volatile solvent and commingling same with an activated silica produced at a later step in the process; separating said silica; commingling the resultant liquid product with an activated clay produced at a later step in the process; preparing said activated clay by commingling diluted sulphuric acid and clay until approximately one-third of the alumina resident in said clay has been converted to aluminum sulphate; separating and reserving the acid menstruum thus produced from the activated clay; drying said clay and commingling it with the mixed fatty and rosin acids as previously prescribed; separating said activated clay as a spent clay from the now substantially decolorized mixed fatty and rosin acids; commingling said spent clay with the acid menstruum previously reserved for this purpose until substantially all the acid and alumina resident in said admixture have reacted to form a solution of aluminum sulphate; separating said solution of aluminum sulphate thus obtaining as an insoluble residue the activated silica previously employed; removing solvent from decolorized mixed fatty and rosin acids and crystallizing a part of the rosin acids resident therein; separating said crystallized rosin acids from the liquid remainder consisting principally of fatty acids.

2. The method of refining tall oil set forth in claim 1, with the added step of cleaning the spent clay obtained therein by treatment with caustic soda prior to commingling with the reserved acid menstruum remaining after the activation of said clay.

3. The method of refining tall oil set forth in claim 1, with the added step of distilling the liquid remainder consisting principally of fatty acids obtained therein until approximately one-third of such fatty acids have been volatilized, the remainder being re-cycled to the crystallizing step.

References Cited in the file of this patent

UNITED STATES PATENTS

| | | |
|---|---|---|
| 1,827,165 | Pfaff et al. | Oct. 13, 1931 |
| 2,225,375 | Krayhill et al. | Dec. 17, 1940 |
| 2,280,843 | Oliver et al. | Apr. 28, 1942 |
| 2,294,446 | Brown et al. | Sept. 1, 1942 |
| 2,397,505 | Richardson | Apr. 2, 1946 |
| 2,408,207 | Garrison et al. | Sept. 24, 1946 |
| 2,486,974 | Othmer et al. | Nov. 1, 1949 |